United States Patent
Chen et al.

(10) Patent No.: US 7,878,467 B2
(45) Date of Patent: Feb. 1, 2011

(54) SUCTION CUP STRUCTURE

(75) Inventors: Shih-Hong Chen, Taipei Hsien (TW); Jen-Yung Chang, Taipei Hsien (TW)

(73) Assignee: Wistron Neweb Corp., Taipei Hsien (TW)

( * ) Notice: Subject to any disclaimer, the term of this patent is extended or adjusted under 35 U.S.C. 154(b) by 12 days.

(21) Appl. No.: 12/453,026

(22) Filed: Apr. 28, 2009

(65) Prior Publication Data
US 2010/0012800 A1   Jan. 21, 2010

(30) Foreign Application Priority Data
Jul. 16, 2008   (TW) .............................. 97126937 A

(51) Int. Cl.
*A45D 42/14*   (2006.01)
*F16B 47/00*   (2006.01)

(52) U.S. Cl. .............. 248/206.2; 248/205.7; 248/205.8; 248/363

(58) Field of Classification Search .............. 248/206.2, 248/205.5, 205.7, 205.8, 206.1, 363, 362
See application file for complete search history.

(56) References Cited

U.S. PATENT DOCUMENTS

| | | | | |
|---|---|---|---|---|
| 2,490,626 A | * | 12/1949 | Harvey | 525/155 |
| 2,915,494 A | * | 12/1959 | Snoddon | 526/204 |
| 4,280,861 A | * | 7/1981 | Schwartz | 156/382 |
| 4,580,751 A | * | 4/1986 | Panzer | 248/205.8 |
| 5,029,786 A | * | 7/1991 | Wu | 248/205.7 |
| 6,962,314 B2 | * | 11/2005 | Hsu | 248/205.5 |
| 7,066,434 B2 | * | 6/2006 | Kwok | 248/205.8 |
| D587,188 S | * | 2/2009 | Mo | D12/415 |
| 7,516,926 B2 | * | 4/2009 | Liu | 248/205.5 |
| 7,578,487 B2 | * | 8/2009 | Kaneda et al. | 248/205.8 |
| 7,628,362 B2 | * | 12/2009 | Song | 248/205.8 |
| 2007/0278371 A1 | * | 12/2007 | Wang | 248/309.3 |
| 2008/0048084 A1 | * | 2/2008 | Takahashi et al. | 248/363 |
| 2008/0230661 A1 | * | 9/2008 | Kawabata | 248/205.5 |
| 2008/0230662 A1 | * | 9/2008 | Takahashi et al. | 248/206.2 |

FOREIGN PATENT DOCUMENTS

| | | |
|---|---|---|
| CN | 101059147 A | 10/2007 |
| CN | 100370155 C | 2/2008 |
| TW | M241537 | 8/2004 |

* cited by examiner

*Primary Examiner*—Anita M King
(74) *Attorney, Agent, or Firm*—Bacon & Thomas, PLLC

(57) ABSTRACT

A suction cup structure is disclosed. The suction cup structure can be attached firmly on a surface of an object. The suction cup structure comprises a suction cup and a gel, wherein the gel has a first surface and a second surface; the first surface is connected to the suction cup, and the second surface is attached to the surface of the object.

12 Claims, 7 Drawing Sheets

SUCTION CUP STRUCTURE

BACKGROUND OF THE INVENTION

1. Field of the Invention

The present invention is related to a suction cup structure and an installation frame with the suction cup structure, and particularly relates to a kind of suction cup structure and an installation frame with the suction cup structure that can be attached firmly to a surface of an object.

2. Description of the Related Art

The suction cup has already become a convenient tool which is ubiquitous in daily life.

Recently, popular electronic devices such as global position systems are often attached to the windshields or windows in a vehicle with suction cups, but they often fall off due to insufficient attaching force. The users often have to attach the suction cup to the window again, which distracts the driver and may lead to accidents.

The improvements to the suction cup in the prior art all focus on expelling the air from the suction cup to increase the difference between the internal and external pressure of the suction cup while the suction cup is attached so as to increase the attachment force, such as shown in files number M328682, M331467 of the Patents of the Republic of China. They disclose a kind of technology which can increase the difference between the internal and external pressure of the suction cup to increase the attachment force.

However, the main reason for poor attachment effects is related to the surface to which the suction cup is attached. If the attachment surface is not smooth, it will cause the air to be sucked into the suction cup such that the attachment force of the suction cup will decrease. Especially, while using the suction cup in a conveyance, if the windshield or windows and doors are rough in surface (i.e., are dirty), the suction cup will fall off very easily with the addition of vibration during driving.

Therefore, there should be provided a kind of suction cup structure that can be attached firmly to an object to improve the existing problems in the prior art.

SUMMARY OF THE INVENTION

The primary object of the invention is to provide a suction cup structure that can substantially be attached firmly to an object.

In order to achieve the above object, the invention provides a kind of suction cup structure for substantially being attached firmly to the object. The suction cup structure comprises a suction cup and a gel, wherein the gel comprises a first surface and a second surface; wherein the first surface is connected to the suction cup, and the gel is self-adhesive. The suction cup can be firmly attached to a surface of an object through the gel itself with a deformation amount and self-adhesivity.

In one embodiment of the invention, the suction cup of the invention comprises a protruding portion. The protruding portion and gel delimit a groove, and the groove comprises an adhesive glue liquid to create a substantially tight connection between the protruding portion and gel.

The invention further provides a kind of installation frame with the aforementioned suction cup structure that can substantially provide a firm attachment to the surface of an object.

DETAILED DESCRIPTION OF THE PREFERRED EMBODIMENT

These and other objects and advantages of the present invention will become apparent from the following description of the accompanying drawings, which disclose several embodiments of the present invention. It is to be understood that the drawings are to be used for purposes of illustration only, and not as a definition of the invention.

Hereafter, please refer to FIGS. 1 to 4B together, which are related to one embodiment of the suction cup structure of the invention.

Figure 1:
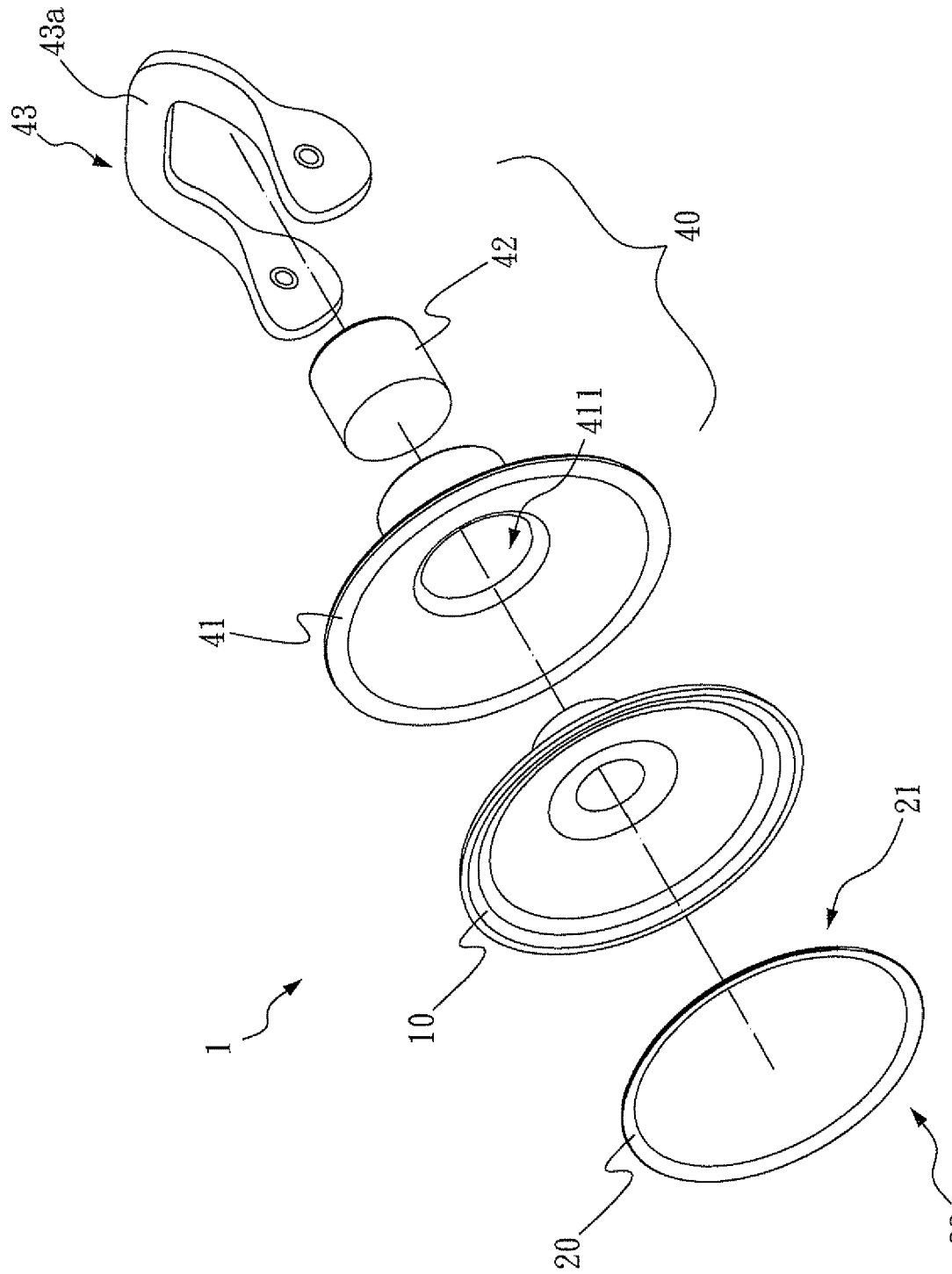
FIG. 1 is a three dimensional analytic diagram of one embodiment of the suction cup structure of the invention.

Please refer to FIG. 1, which is a three dimensional analytic diagram of one embodiment of the suction cup structure of the invention. The suction cup structure of the invention comprises a suction cup 10 and a gel 20, wherein the gel 20 comprises a first surface 21 and a second surface 22; wherein the first surface 21 is connected to the suction cup 10, and the second surface 22 is in contact with a rough surface to which the suction cup is to be attached, and the gel 20 has self-adhesivity. In one embodiment of the invention, the connection method between the suction cup 10 and the first surface 21 of the gel 20 is to use a dot-gluing method to plaster uniformly one side of the suction cup 10 with glue and form a circle, and then to make out a circular shaped sheet of gel 20 to be tape-fitted to one side of the suction cup 10 (please refer to FIG. 1), but the invention is not limited to this. In one embodiment of the invention, the gel 20 is a silicone rubber; and in another embodiment of the invention, the gel 20 is a platinum-addition-cured molding silicone rubber or dual liquid condensation typed silicone rubber, but the invention is not limited to this, wherein the platinum-addition-cured molding silicone rubber or dual liquid condensation typed silicone rubber has self-adhesivity. During use, if the gel is stained or acquires surface impurities or dust such that the adhesivity is decreased, flushing the gel with water can restore the original adhesivity.

In one embodiment of the invention, the shape of the gel 20 can be a hollow circular shape (as shown in FIG. 1), or it can be a solid circular shape (not shown in the figure), or it can be a non-circular shape, but the invention is not limited to this.

In one embodiment of the invention, the suction cup structure 1 further comprises an exhaust portion 40 to enhance the close attachment. The exhaust portion 40 comprises a cover portion 41, a force-bearing portion 42, and a force-exerting portion 43, wherein the force-bearing portion 42 is penetrated through the hole 411, connected with the cover portion 41, and in contact with the suction cup 10; and the force-exerting portion 43 is connected with the cover portion 41. The force-exert portion 43 can exert pressure on the force-bearing portion 42 to make the force-bearing portion 42 apply downward force on cover portion 41 and the suction cup 10. As a result of the air being forced out of the suction cup 10, the suction cup structure 1 can be firmly attached to the surface of the object to reinforce the attaching force of the suction cup 10.

Figure 2:
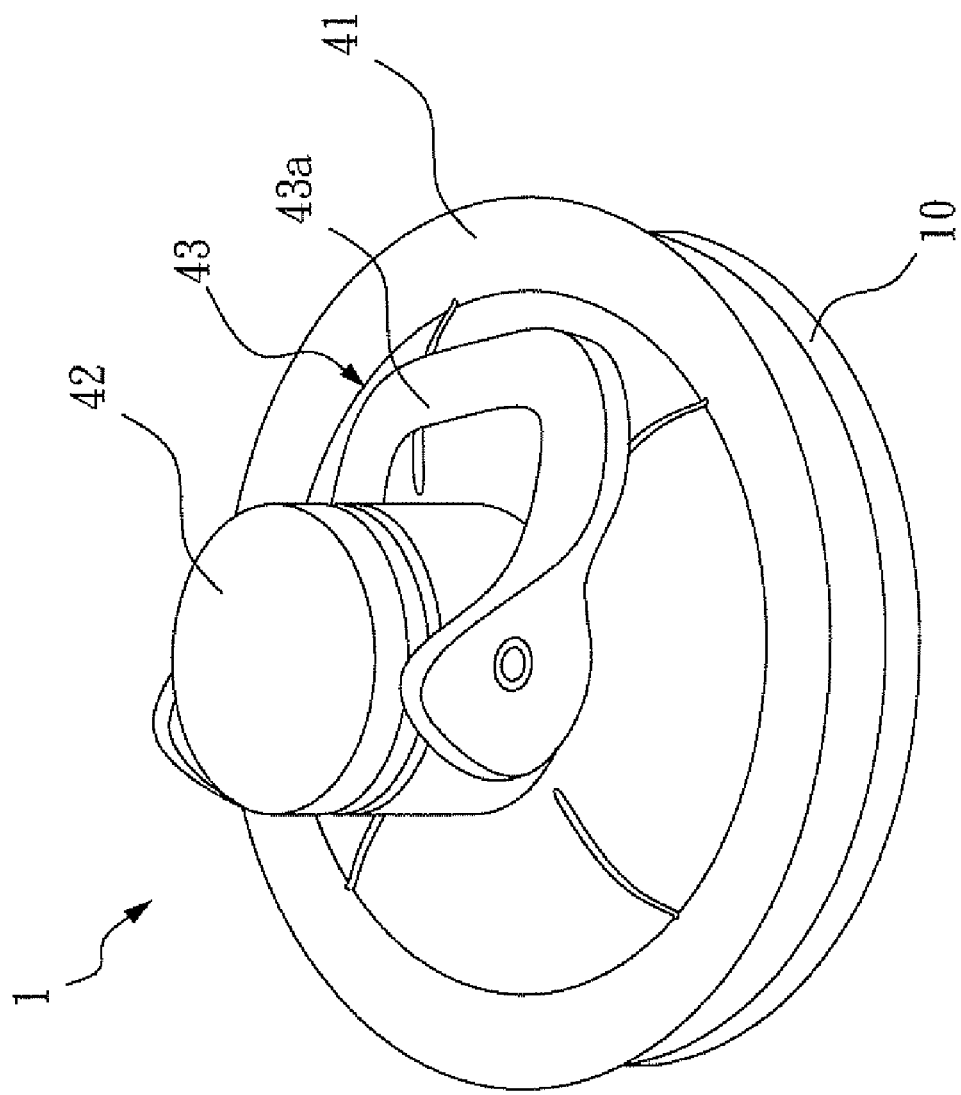
FIG. 2 is an assembling diagram of one embodiment of the suction cup structure of the invention.

Now please refer to FIG. 2. In one embodiment of the invention, the force-exerting portion 43 comprises a snap ring 43a. The snap ring 43a is pivot-linked with the cover portion 41. When the user wants to use the suction cup structure 1, the surface to which the suction cup structure 1 is to be attached is wiped clean. Then the suction cup structure 1 is laid on the surface, after which the snap ring 43a is rotated. The snap ring 43a can push the force-bearing portion 42 through the hole 411 toward the cover portion 41. The cover portion 41 further presses down the suction cup 10 to expel the air in the suction cup 10. The attachment force of the suction cup 10 is thus enhanced.

Figure 3:
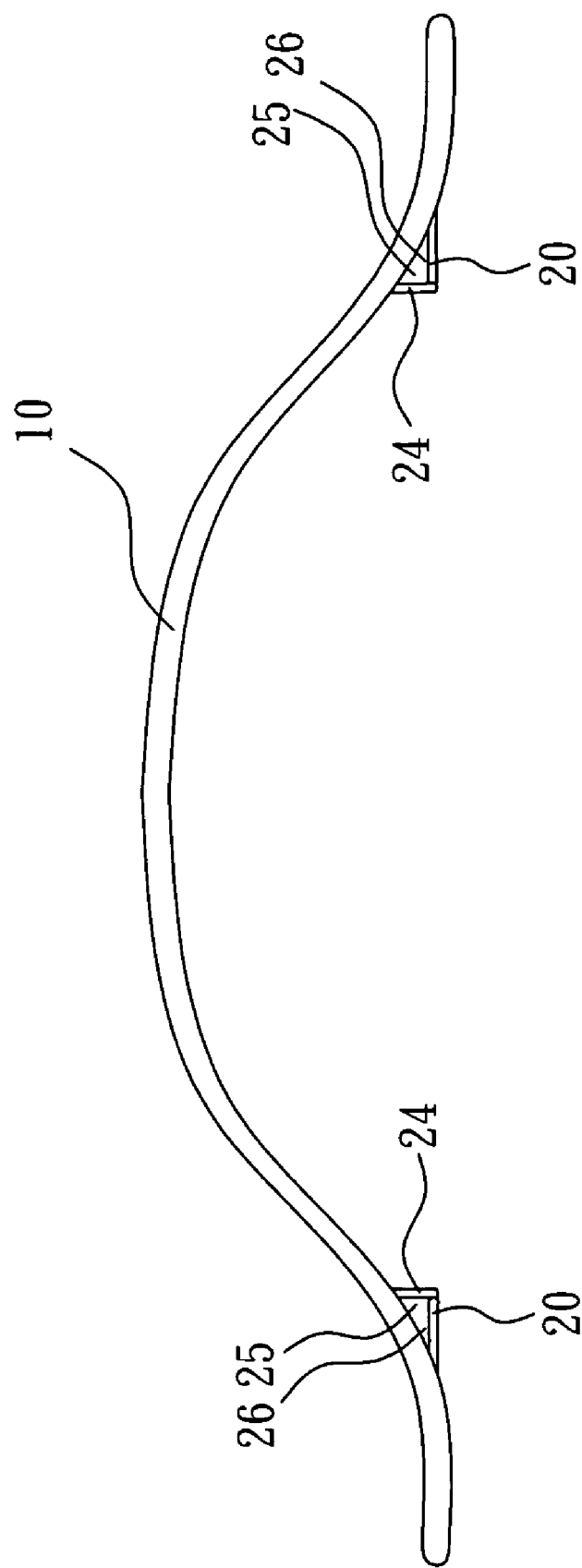
FIG. 3 is a connection diagram of a cup and a gel of the suction cup structure of the invention.

Now please refer to FIG. 3. In one embodiment of the invention, the suction cup 10 comprises a protruding portion 24. The protruding portion 24 and gel 20 delimit a groove 25. The groove 25 is filled with an adhesive glue liquid 26. When the adhesive glue liquid 26 has dried, the protruding portion 24 and gel 20 substantially can have a tight connection, but the invention is not limited to this. For example, the gel 20 is also able to execute a direct adhesive coalition (not shown in figure). Alternatively, the gel 20 can be pre-hardened. The hardened gel 20 further executes an adhesive combination (not shown in figure). Thus, it can also achieve the purpose of the invention.

In one embodiment of the invention, the suction cup structure of the invention not only can be firmly attached to a smooth surface but also can be firmly attached to an object with a rough surface. When the suction cup 10 is attached an object with a rough surface, the gel 20 can substantially fill the fine seams on the rough surface such that the suction cup 10 is substantially attached to the object. For example, the object with a rough surface can be an object made of leather or other textured material, but the invention is not limited to this.

Figure 4A:
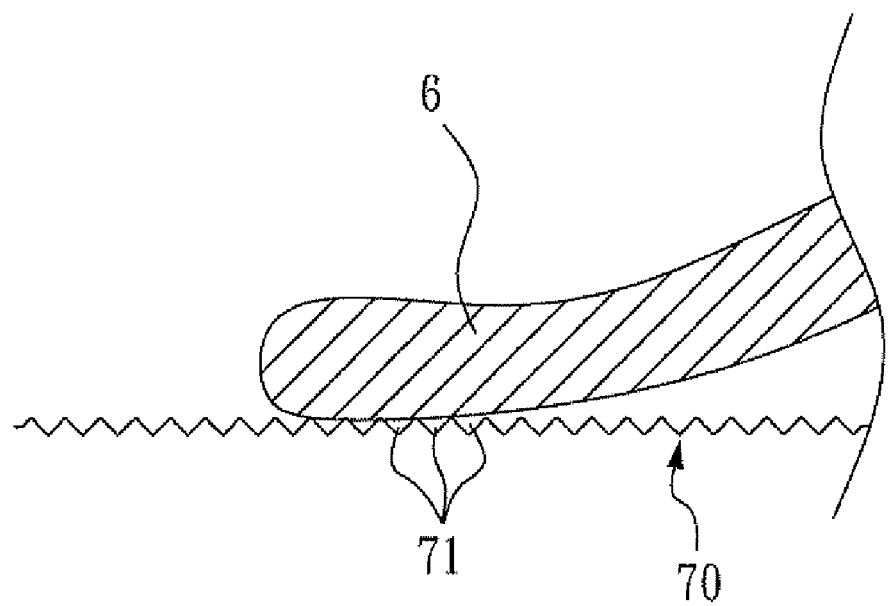
FIG. 4A is a side view cross-section diagram of a traditional suction cup structure attached to a rough surface.
Figure 4B:
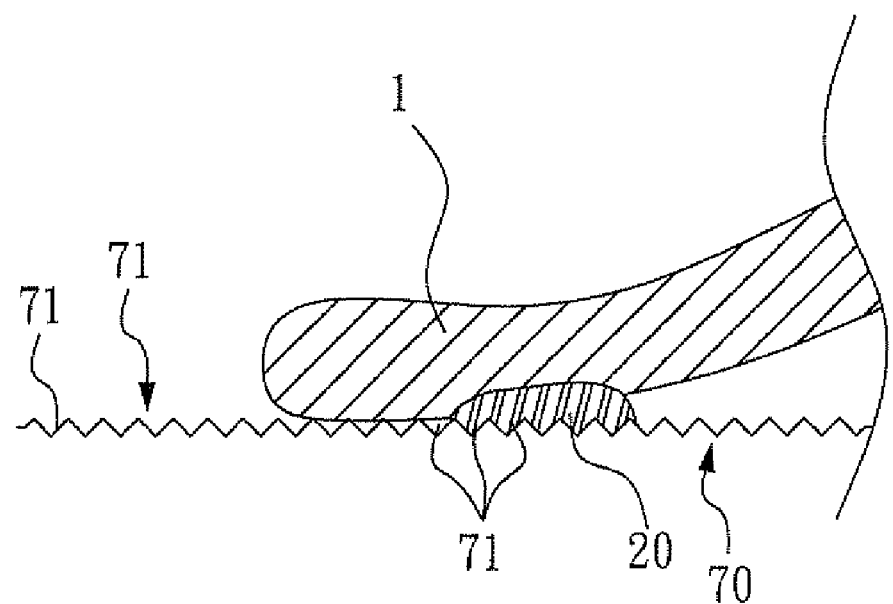
FIG. 4B is a side view cross-section diagram of a suction cup structure of the invention attached to a rough surface.

Now please refer to FIGS. 4A and 4B, which show a traditional suction cup structure and a side view cross-section diagram of one embodiment of the invention during use; wherein FIG. 4A is a side view cross-section diagram of a traditional suction cup structure attached to a rough surface; and FIG. 4B is a side view cross-section diagram of a suction cup structure of the invention attached to a rough surface.

As shown in FIG. 4A, when the traditional suction cup structure 6 is attached to a rough surface 70, the suction cup 10 in the traditional suction cup structure 6 cannot be firmly attached to the rough surface 70 due to the seams 71 on the rough surface 70. After the air in the suction cup 10 is expelled, air will still enter the suction cup 10 through the seams 10. The traditional suction cup structure 6 will be gradually separated from the rough surface 70. As shown in FIG. 4B, when the suction cup structure 1 of the invention is attached to a rough surface 70, the gel 20 can be deformed and sunk into the seams 71 because the gel 20 has the deformation ability and self-adhesivity. Air is thus prevented from entering the suction cup 10. Therefore, it can form a firm attachment to the rough surface 70.

The invention further discloses an installation frame 50 with a suction cup structure. Please refer to those FIGS. 5, 6A, and 6B together, which present one embodiment of an installation frame with a suction cup structure of the present invention.

Figure 5:
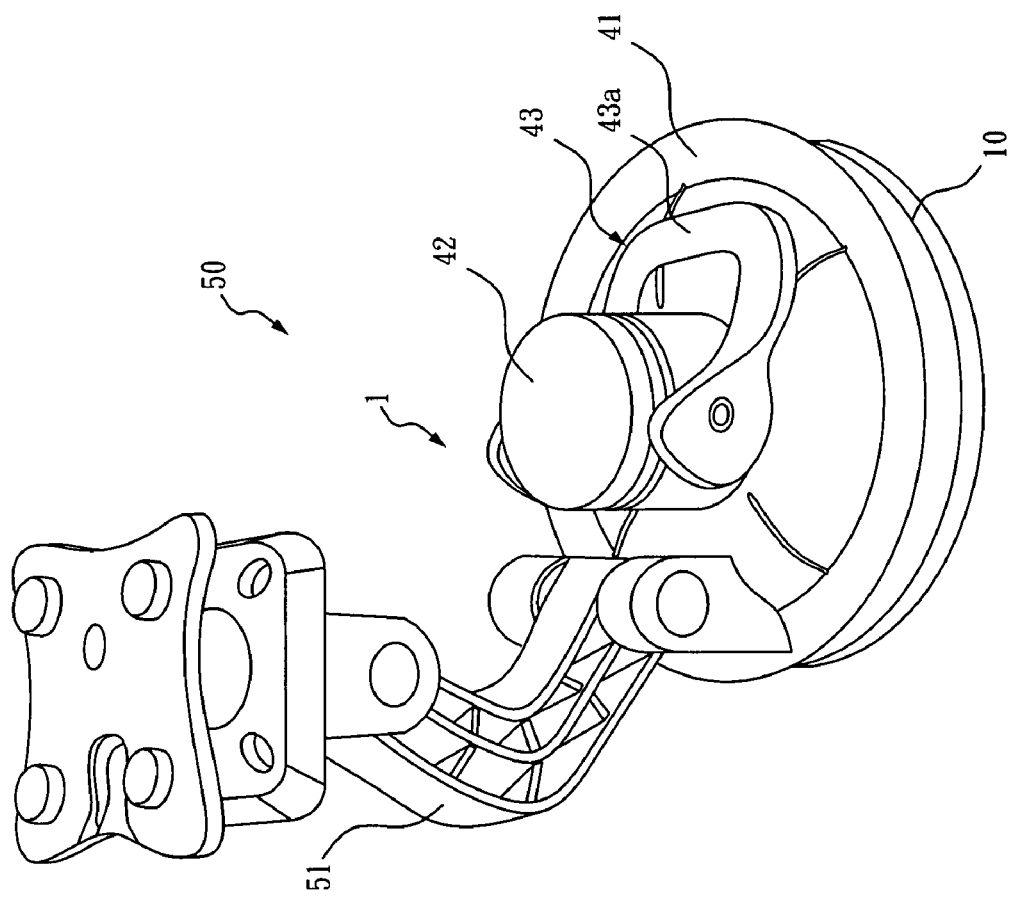
FIG. 5 is a diagram of one embodiment of an installation frame with a suction cup structure of the invention.
Figure 6A:
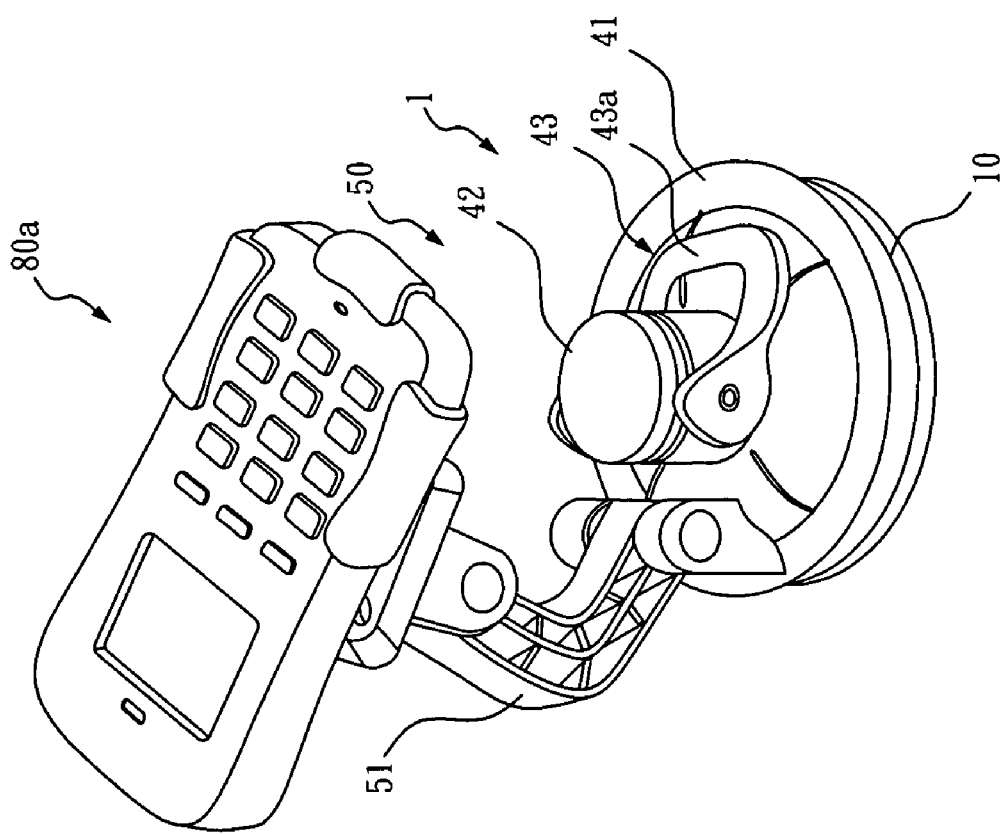
FIG. 6A is a usage diagram of one embodiment of the installation frame with a suction cup structure of the invention and an electronic device.
Figure 6B:
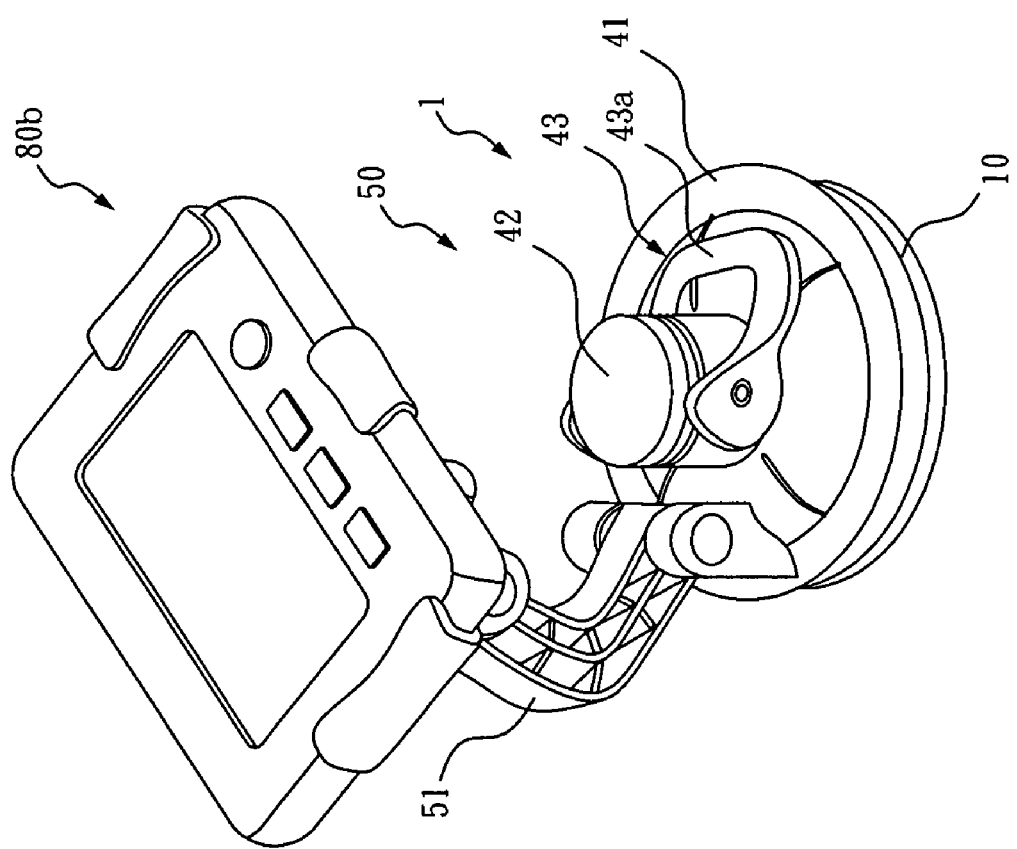
FIG. 6B is a usage diagram of another embodiment of the installation frame with a suction cup structure of the invention and an electronic device.

As shown in FIG. 5, the invention is a kind of installation frame 50 with a suction cup structure 1. The installation frame 50 with a suction cup structure 1 can provide a substantially firm attachment to an object. The installation frame 50 with a suction cup structure 1 comprises an installation frame body 51 and a suction cup structure 1. The suction cup structure 1 and the installation frame body 51 can have a separable connection. In one embodiment of the invention, the installation frame body 51 is pivot-linked with the suction cup structure 1. The user can adjust the angle of the installation frame body 51 during use, but the invention is not limited to this structure. For example, as shown in FIGS. 6A and 6B, in one embodiment of the invention, the installation frame body 51 can have a separable connection with an electronic devices 80a or 80b, wherein the electronic device 80a is a cellular phone (as shown in FIG. 6A) or a Global Positioning System (GPS, as shown in FIG. 80b), but the invention is not limited to this structure. The installation frame body 51 of the invention is also able to connect with a Personal Digital Assistant (PDA) (not shown in figure) or an externally connected screen (not shown in figure).

Although the present invention has been explained in relation to its preferred embodiments, it is to be understood that many other possible modifications and variations can be made without departing from the spirit and scope of the invention as hereinafter claimed.

What is claimed is:

1. A suction cup structure that can be attached firmly on a surface of an object comprising:
   a suction cup;
   a gel comprising a first surface and a second surface, wherein the first surface is connected to the suction cup; when the suction cup is attached to the object, the second surface is substantially able to attach the suction cup firmly to the surface of the object,
   wherein the suction cup comprises a protruding portion; the protruding portion and gel delimit a groove, and the groove comprises an adhesive glue liquid to form a tight connection between the protruding portion and the gel,
   wherein the gel has self-adhesivity,
   an exhaust portion comprising:
      a cover portion, which comprises a hole with the cover portion capped on the suction cup;
      a force-bearing portion, which is penetrated through the hole and connected with the cover portion, and which is in contact with the suction cup; and
      a force-exerting portion, which comprises a snap ring pivot-linked to the cover portion; the force-exerting portion can exert downward pressure on the force-bearing portion to compress the suction cup and thus forcibly expel the air from the suction cup to reinforce the attaching force of the suction cup.

2. The suction cup structure as claimed in claim 1, wherein the gel is silicone rubber.

3. The suction cup structure as claimed in claim 1, wherein the gel is platinum-addition-cured molding silicone rubber.

4. The suction cup structure as claimed in claim 1, wherein the gel is a dual liquid condensation type silicone rubber.

5. The suction cup structure as claimed in claim 1, wherein the object has a rough surface; when the suction cup is attached to the rough surface, the gel can substantially fill in fine seams on the rough surface such that the suction cup substantially is attached firmly to the object.

6. An installation frame with a suction cup structure that can substantially provide a firm attachment to an object comprising:
- an installation frame body; and
- a suction cup structure, which is connected with the installation frame body, comprising:
  - a suction cup;
  - a gel, which comprises a first surface and a second surface, wherein the first surface is connected with the suction cup such that when the suction cup is attached to an object, the second surface can substantially attach firmly the installation frame with the suction cup structure to the object,
  - wherein the suction cup comprises a protruding portion; the protruding portion and gel delimit a groove, and the groove comprises an adhesive glue liquid to make the protruding portion and gel substantially have a tight combination,
  - wherein the gel has self-adhesivity,
  - an exhaust portion comprising:
    - a cover portion, which comprises a hole with the cover portion capped on the suction cup;
    - a force-bearing portion, which is penetrated through the hole and connected with the cover portion, and which is in contact with the suction cup; and
    - a force-exerting portion, which comprises a snap ring pivot-linked to the cover portion; the force-exerting portion can exert downward pressure on the force-bearing portion to compress the suction cup and thus forcibly expel the air from the suction cup to reinforce the attaching force of the suction cup.

7. The installation frame with the suction cup structure as claimed in claim 6, wherein the gel is silicone rubber.

8. The installation frame with the suction cup structure as claimed in claim 7, wherein the gel is a platinum-cured molding silicone rubber.

9. The installation frame with the suction cup structure as claimed in claim 7, wherein the gel is dual liquid condensation type silicone rubber.

10. The installation frame with the suction cup structure as claimed in claim 6, wherein the object has a rough surface; when the installation frame with a suction cup structure is attached to the rough surface, the gel can substantially fill in fine seams on the rough surface such that the installation frame with a suction cup structure substantially is attached to the object.

11. The installation frame with the suction cup structure as claimed in claim 6, wherein the installation body can have a separable type connection with an electronic device.

12. The installation frame with the suction cup structure as claimed in claim 6, wherein the electronic device is a global positioning system, a cellular phone, a Personal Digital Assistant, or an externally connected screen.

\* \* \* \* \*